United States Patent
Lim et al.

(10) Patent No.: US 9,472,316 B2
(45) Date of Patent: Oct. 18, 2016

(54) DIELECTRIC COMPOSITION FOR LOW-TEMPERATURE SINTERING, MULTILAYER CERAMIC ELECTRONIC COMPONENT CONTAINING THE SAME, AND METHOD OF MANUFACTURING MULTILAYER CERAMIC ELECTRONIC COMPONENT

(71) Applicant: SAMSUNG ELECTRO-MECHANICS CO., LTD., Suwon-Si, Gyeonggi-Do (KR)

(72) Inventors: Jong Bong Lim, Suwon-Si (KR); Seok Hyun Yoon, Suwon-Si (KR); No Hoon Park, Suwon-Si (KR); Doo Young Kim, Suwon-Si (KR); Chang Hoon Kim, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/682,788

(22) Filed: Apr. 9, 2015

(65) Prior Publication Data

US 2016/0055933 A1    Feb. 25, 2016

(30) Foreign Application Priority Data

Aug. 22, 2014 (KR) .......................... 10-2014-0109858

(51) Int. Cl.
| | |
|---|---|
| *C04B 35/00* | (2006.01) |
| *H01B 3/12* | (2006.01) |
| *C04B 35/468* | (2006.01) |
| *H01G 4/30* | (2006.01) |
| *H01G 4/12* | (2006.01) |

(52) U.S. Cl.
CPC ............... *H01B 3/12* (2013.01); *C04B 35/468* (2013.01); *H01G 4/1227* (2013.01); *H01G 4/30* (2013.01)

(58) Field of Classification Search
CPC .......................... C04B 35/468; C04B 35/4682
USPC ................................... 501/137, 138
See application file for complete search history.

(56) References Cited

U.S. PATENT DOCUMENTS

| | | | | |
|---|---|---|---|---|
| 5,051,863 | A | 9/1991 | Chazono et al. | |
| 5,397,753 | A * | 3/1995 | Nishiyama | ........... H01G 4/1227 501/138 |
| 5,612,268 | A * | 3/1997 | Iwamoto | ............. C04B 35/4682 501/137 |
| 6,489,257 | B1 * | 12/2002 | Hiramatsu | ........... H01G 4/1227 361/321.4 |
| 2007/0161498 | A1* | 7/2007 | Takeoka | .............. C04B 35/4682 501/134 |
| 2012/0270720 | A1* | 10/2012 | Tanabe | .................... C03C 3/066 501/138 |
| 2013/0244857 | A1* | 9/2013 | Oh | .......................... C03C 3/064 501/32 |

FOREIGN PATENT DOCUMENTS

| | | |
|---|---|---|
| KR | 1993-0004740 B1 | 6/1993 |
| KR | 10-1339396 B1 | 12/2013 |

\* cited by examiner

*Primary Examiner* — Noah Wiese

(74) *Attorney, Agent, or Firm* — McDermott Will & Emery LLP

(57) ABSTRACT

There are provided a dielectric composition for low-temperature sintering and a multilayer ceramic electronic component manufactured using the dielectric composition and the dielectric composition may contains: $BaTiO_3$ as a main ingredient; and a $Li_2O$—$BaO$ compound as an accessory ingredient, wherein the accessory ingredient is contained in an amount of 0.2 mol % to 0.8 mol %, on the basis of 100 mol % of the main ingredient.

23 Claims, 9 Drawing Sheets

FIG. 3

DIELECTRIC COMPOSITION FOR LOW-TEMPERATURE SINTERING, MULTILAYER CERAMIC ELECTRONIC COMPONENT CONTAINING THE SAME, AND METHOD OF MANUFACTURING MULTILAYER CERAMIC ELECTRONIC COMPONENT

CROSS-REFERENCE TO RELATED APPLICATION

This application claims the priority and benefit of Korean Patent Application No. 10-2014-0109858 filed on Aug. 22, 2014, with the Korean Intellectual Property Office, the disclosure of which is incorporated herein by reference.

BACKGROUND

The present disclosure relates to a dielectric composition for low-temperature sintering, a multilayer ceramic electronic component containing the same, and a method of manufacturing a multilayer ceramic electronic component.

In accordance with the recent trend for the miniaturization of electronic products using multilayer ceramic capacitors (MLCCs) and improvements in the performance thereof, multilayer ceramic capacitors commonly used in electronic products have been miniaturized while being increased in terms of capacitance.

That is, in accordance with the demand for subminiature and super high capacitance MLCCs, ceramic layers have been thinned and an increased number thereof have been stacked for obtaining target capacitance. Therefore, high degrees of reliability, as well as stability in obtaining target capacitance and a low dissipation factor have been required in MLCCs.

Particularly, in order to secure super high capacitance in a small-sized MLCC, dielectric layers thereof must be formed to be ultra thin.

In order to achieve a high degree of reliability therein, in addition to high capacitance and a low dissipation factor in the ultra-thin layers, a dielectric composition having excellent dielectric properties is important, and connectivity of internal electrodes formed in a manner in which the internal electrodes and the dielectric layers are alternately stacked is also important.

In the case of manufacturing the multilayer ceramic capacitor using a dielectric material containing $BaTiO_3$, when a sintering temperature exceeds 1200° C., nickel internal electrodes may be shrunk. In this case, stress may be generated in the multilayer ceramic capacitor due to a difference in shrinkage behaviors between the internal electrodes and the dielectric layers.

In addition, as the nickel internal electrodes are shrunk, the possibility of short circuits is rapidly increased, and the electrode connectivity or coverage may be decreased due to oxidation of the internal electrodes, resulting in a decrease in capacitance.

Further, it is highly likely to deteriorate the reliability due to a decrease in insulation resistance at a high temperature (>1200° C.) in addition to the decrease in capacitance.

Therefore, a dielectric composition capable of being sintered at a low temperature of 1200° C. or less is required.

RELATED ART DOCUMENT (Patent Document 1) Korean Patent No. 10-1339396
(Patent Document 2) Korean Patent No. 10-0065185

SUMMARY

An exemplary embodiment in the present disclosure may provide a dielectric composition capable of being sintered at a low temperature, and a multilayer ceramic electronic component manufactured using the dielectric composition.

According to an aspect of the present disclosure, a dielectric composition for low-temperature sintering may contain $BaTiO_3$ as a main ingredient; and a $Li_2O$—$BaO$ compound as an accessory ingredient, wherein the accessory ingredient is contained in an amount of 0.2 mol % to 0.8 mol %, on the basis of 100 mol % of the main ingredient.

According to another aspect of the present disclosure, a multilayer ceramic electronic component may include: a multilayer body formed by stacking a plurality of dielectric layers containing $BaTiO_3$ as a main ingredient and a $Li_2O$—$BaO$ compound as an accessory ingredient; first and second internal electrodes formed on the dielectric layers so as to have alternating polarities; a first external electrode formed on one end surface of the multilayer body to be electrically connected to the first internal electrodes; and a second external electrode formed on the other end surface of the multilayer body opposing one end surface thereof on which the first external electrode is formed to be electrically connected to the second internal electrodes, wherein the accessory ingredient is contained in an amount of 0.2 mol % to 0.8 mol %, on the basis of 100 mol % of the main ingredient.

According to another aspect of the present disclosure, a method of manufacturing a multilayer ceramic electronic component may include: preparing a dielectric composition for low-temperature sintering containing $BaTiO_3$ as a main ingredient and a $Li_2O$—$BaO$ compound as an accessory ingredient; preparing ceramic green sheets using the dielectric composition; forming internal electrodes on the ceramic green sheets; stacking and compressing the ceramic green sheets to prepare a ceramic multilayer body; and sintering the ceramic multilayer body, wherein the accessory ingredient is contained in an amount of 0.2 mol % to 0.8 mol %, on the basis of 100 mol % of the main ingredient.

BRIEF DESCRIPTION OF DRAWINGS

The above and other aspects, features and advantages of the present disclosure will be more clearly understood from the following detailed description taken in conjunction with the accompanying drawings, in which:

FIG. 3 is photographs showing micro-structures of sintered ceramic multilayer bodies after sintering, depending on a sintering temperature of the ceramic multilayer body;

DETAILED DESCRIPTION

Figure 1:
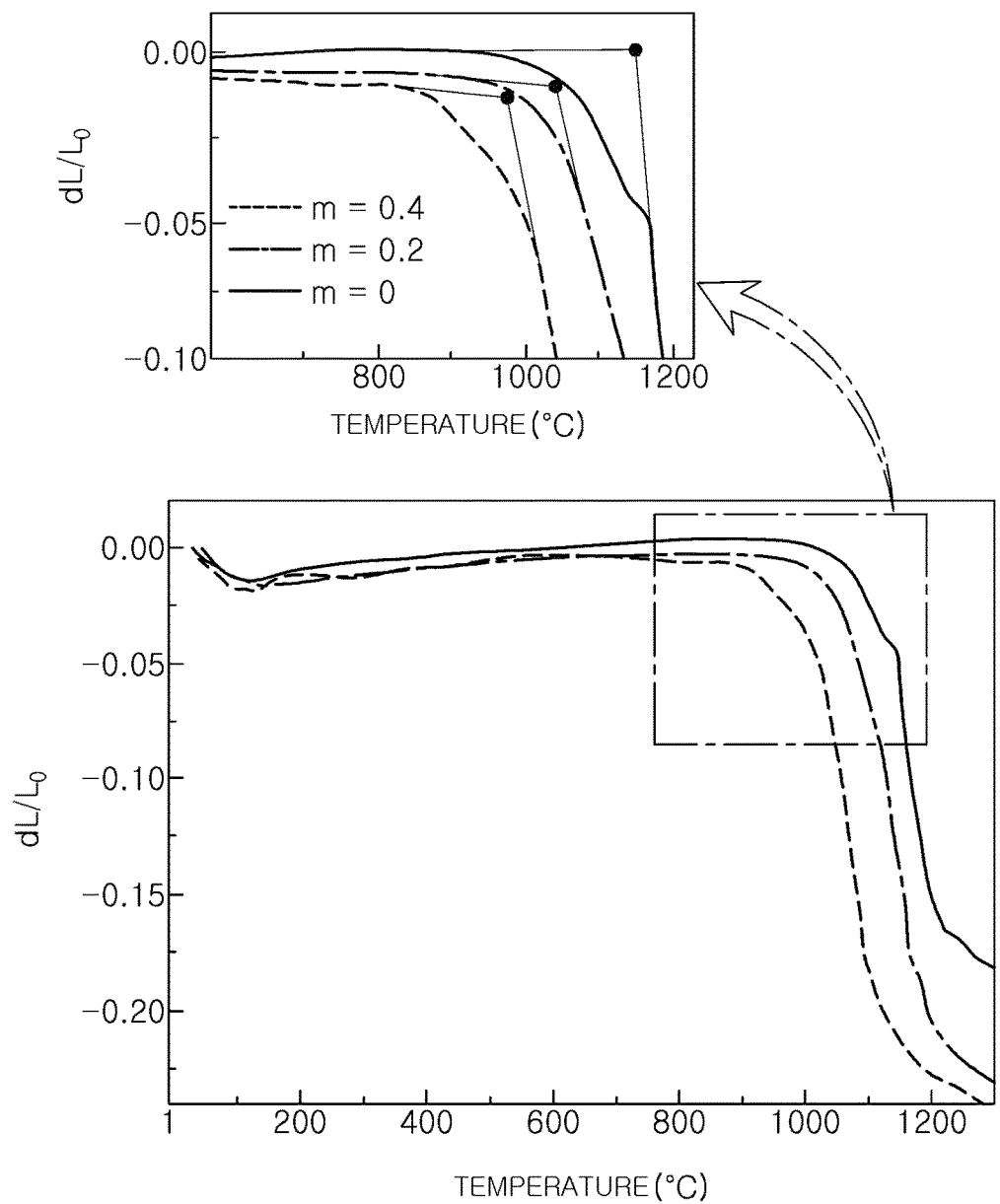
FIG. 1 is a graph schematically showing a shrinkage behavior of a ceramic multilayer body manufactured by adjusting a composition ratio of an accessory ingredient of a dielectric composition for low-temperature sintering according to the present disclosure and then using this dielectric composition depending on a temperature change from room temperature to 1250° C., which is measured using a dilatometer.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In the accompanying drawings, an X-direction refers to a length direction, a y-direction refers to a width direction, and a z-direction refers to a height direction.

A multilayer ceramic electronic component according to an exemplary embodiment of the present disclosure may be appropriately used in a multilayer ceramic capacitor, a multilayer varistor, a thermistor, a piezoelectric element, a multilayer substrate, or the like, having a structure in which a dielectric layer corresponding to a ceramic layer is used and internal electrodes face each other, having the dielectric layer therebetween.

Dielectric Composition for Low-Temperature Sintering

A dielectric composition for low-temperature sintering according to an exemplary embodiment of the present disclosure may contain $BaTiO_3$ as a main ingredient and a $Li_2O$—BaO compound as an accessory ingredient, wherein the accessory ingredient may be contained in an amount of 0.2 mol % to 0.8 mol %, on the basis of 100 mol % of the main ingredient.

The dielectric composition for low-temperature sintering according to an exemplary embodiment of the present disclosure may contain $BaTiO_3$ as the main ingredient.

$BaTiO_3$ based dielectric powder that is generally used in a ceramic electronic component may be used, and $(Ba_{1-a}Ca_a)TiO_3$, $Ba(Ti_{1-b}Ca_b)O_3$, $(Ba_{1-a}Ca_a)(Ti_{1-b}Zr_b)O_3$, or $Ba(Ti_{1-b}Zr_b)O_3$, or the like, in which Ca, Zr, and the like, are partially solid-dissolved in $BaTiO_3$ may be used.

An average particle size of $BaTiO_3$ based base material powder may be 0.05 to 0.5 μm, but is not limited thereto.

The dielectric composition for low-temperature sintering according to an exemplary embodiment of the present disclosure may contain the $Li_2O$—BaO compound as the accessory ingredient.

The $Li_2O$—BaO compound may become various compounds depending on a coupling ratio of Li and Ba, a phase of the accessory ingredient may be changed depending on this coupling ratio.

As the phase of the accessory ingredient is changed, a melting point of the accessory ingredient may be changed.

In order to decreasing the melting point of the accessory ingredient, the accessory ingredient may have the following ingredient ratio.

Referring to Table 1, the $Li_2O$—BaO compound may be bonded in a form of $(2-2x)Li_2O\text{-}xBaO$ to form a compound, wherein x may be 0.1 to 0.9.

TABLE 1

| | Li | Ba | O | Molecular Formula | Sintering Additive Role |
|---|---|---|---|---|---|
| A-1 | 2.0 | 0.0 | 1 | $Li_2O$ | x |
| A-2 | 1.8 | 0.1 | 1 | $Li_{1.8}Ba_{0.1}O$ | o |
| A-3 | 1.6 | 0.2 | 1 | $Li_{1.6}Ba_{0.2}O$ | o |
| A-4 | 1.4 | 0.3 | 1 | $Li_{1.4}Ba_{0.3}O$ | o |
| A-5 | 1.2 | 0.4 | 1 | $Li_{1.2}Ba_{0.4}O$ | o |
| A-6 | 1.0 | 0.5 | 1 | $Li_{1.0}Ba_{0.5}O$ | o |
| A-7 | 0.8 | 0.6 | 1 | $Li_{0.8}Ba_{0.4}O$ | o |
| A-8 | 0.6 | 0.7 | 1 | $Li_{0.6}Ba_{0.3}O$ | o |
| A-9 | 0.4 | 0.8 | 1 | $Li_{0.4}Ba_{0.2}O$ | o |
| A-10 | 0.2 | 0.9 | 1 | $Li_{0.2}Ba_{0.1}O$ | o |
| A-11 | 0.0 | 1.0 | 1 | BaO | x |

As shown in Table 1, in the case of A-1 in which a content of BaO is low and in the case of A-11 in which a content of BaO is high, since a liquid phase formation temperature is increased, such that A-1 and A-11 are not suitable for a sintering additive.

Referring to Table 2, the $Li_2O$—BaO compound may be bonded in a form of $(1-y)Li_2O\text{-}yBaO$ to form a compound, wherein y may be 0.1 to 0.8.

TABLE 2

| | Li | Ba | O | Molecular Formula | Sintering Additive Role |
|---|---|---|---|---|---|
| B-1 | 1.0 | 0.0 | 0.5 | $LiO_{0.5}$ | x |
| B-2 | 0.9 | 0.1 | 0.55 | $Li_{0.9}Ba_{0.1}O_{0.55}$ | o |
| B-3 | 0.8 | 0.2 | 0.6 | $Li_{0.8}Ba_{0.2}O_{0.6}$ | o |
| B-4 | 0.7 | 0.3 | 0.65 | $Li_{0.7}Ba_{0.3}O_{0.65}$ | o |
| B-5 | 0.6 | 0.4 | 0.7 | $Li_{0.6}Ba_{0.4}O_{0.7}$ | o |
| B-6 | 0.5 | 0.5 | 0.75 | $Li_{0.5}Ba_{0.5}O_{0.75}$ | o |
| B-7 | 0.4 | 0.6 | 0.8 | $Li_{0.4}Ba_{0.4}O_{0.8}$ | o |
| B-8 | 0.3 | 0.7 | 0.85 | $Li_{0.3}Ba_{0.3}O_{0.85}$ | o |
| B-9 | 0.2 | 0.8 | 0.9 | $Li_{0.2}Ba_{0.2}O_{0.9}$ | o |
| B-10 | 0.1 | 0.9 | 0.95 | $Li_{0.1}Ba_{0.1}O_{0.95}$ | x |
| B-11 | 0.0 | 1.0 | 1 | BaO | x |

As shown in Table 2, in the case of B-1 in which a content of BaO is low and in the cases of B-10 and B-11 in which a content of BaO is high, since a liquid phase formation temperature is increased, such that B-1, B-10, and B-11 are not suitable for an sintering additive.

Referring to Table 3, the $Li_2O$—BaO compound may be bonded in a form of $zLi_2O\text{-}(2\text{-}2z)BaO$ to form a compound, wherein z may be 0.1 to 0.7.

TABLE 3

| | Li | Ba | O | Molecular Formula | Sintering Additive Role |
|---|---|---|---|---|---|
| C-1 | 1.0 | 0.0 | 0.5 | $LiO_{0.5}$ | x |
| C-2 | 0.9 | 0.2 | 0.65 | $Li_{0.9}Ba_{0.2}O_{0.65}$ | x |
| C-3 | 0.8 | 0.4 | 0.8 | $Li_{0.8}Ba_{0.4}O_{0.8}$ | x |
| C-4 | 0.7 | 0.6 | 0.95 | $Li_{0.7}Ba_{0.6}O_{0.95}$ | o |
| C-5 | 0.6 | 0.8 | 1.1 | $Li_{0.6}Ba_{0.8}O_{1.1}$ | o |
| C-6 | 0.5 | 1.0 | 1.25 | $Li_{0.5}Ba_{1.0}O_{1.25}$ | o |
| C-7 | 0.4 | 1.2 | 1.4 | $Li_{0.4}Ba_{1.2}O_{1.4}$ | o |
| C-8 | 0.3 | 1.4 | 1.55 | $Li_{0.3}Ba_{1.4}O_{1.55}$ | o |
| C-9 | 0.2 | 1.6 | 1.7 | $Li_{0.2}Ba_{1.6}O_{1.7}$ | o |
| C-10 | 0.1 | 1.8 | 5 | $Li_{0.1}Ba_{1.8}O_5$ | o |
| C-11 | 0.0 | 2.0 | 2.0 | BaO | x |

As shown in Table 3, in the cases of C-1, C-2, and C-3 in which a content of BaO is low and in the case of C-11 in which a content of BaO is high, since a liquid phase formation temperature is increased, such that C-1, C-2, C-3, and C-11 are not suitable for a sintering additive.

The accessory ingredient may be contained in an amount of 0.2 mol % to 0.8 mol %, on the basis of 100 mol % of the main ingredient.

That is, in the case in which the content of the accessory ingredient is less than 0.2 mol %, on the basis of 100 mol % of the main ingredient, an amount of a liquid phase is small, such that it may be difficult to induce low-temperature densification, and in the case in which the content is more than 0.8 mol %, an excessive amount of the liquid phase may be formed, thereby forming a non-uniform micro-structure.

FIG. 1 is a graph schematically showing a shrinkage behavior of a ceramic multilayer body manufactured by adjusting a composition ratio of an accessory ingredient of a dielectric composition for low-temperature sintering according to the present disclosure and then using this dielectric composition depending on a temperature change from room temperature to 1250° C., which is measured using a dilatometer.

The shrinkage behavior was measured while adjusting a content of the $LiO_2$—BaO compound as the accessory ingredient.

In the case in which the $LiO_2$—BaO compound as the accessory ingredient was not contained (m=0), a rapid shrinkage behavior caused by densification was generated at 1110° C. or more.

However, it may be appreciated that in the case in which the content of the accessory ingredient was 0.2 mol %, on the basis of 100 mol % of the main ingredient (m=0.2), a rapid shrinkage behavior was generated at 1041° C. Therefore, it may be appreciated that a densification initiation temperature was decreased by 80° C. or more as compared to the case in which m was 0.

In addition, in the case in which the content of the accessory ingredient was 0.4 mol %, on the basis of 100 mol % of the main ingredient (m=0.4), a densification temperature was 992° C., such that the densification initiation temperature was decreased by about 128° C. as compared to the case in which m was 0.

That is, it may be appreciated that as the content of the accessory ingredient is increased, an effect of decreasing a sintering temperature may be increased.

Figure 2:
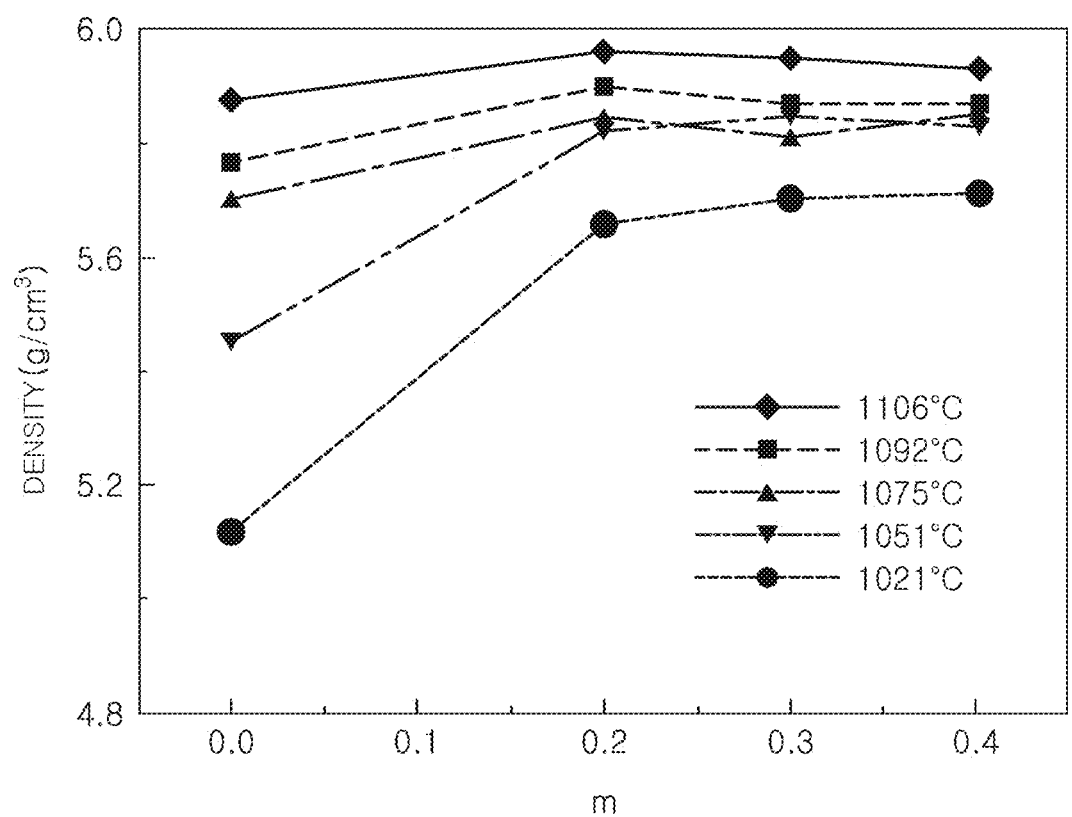
FIG. 2 is a graph showing a density after sintering a ceramic multilayer body manufactured by adjusting a composition ratio of an accessory ingredient of a dielectric composition for low-temperature sintering according to the present disclosure and then using this dielectric composition at each sintering temperature.

FIG. 2 is a graph showing a density after sintering a ceramic multilayer body manufactured by adjusting a composition ratio of an accessory ingredient of a dielectric composition for low-temperature sintering according to the present disclosure and then using this dielectric composition at each sintering temperature.

Referring to FIG. 2, it may be appreciated that in the case in which m was 0, density after sintering the ceramic multilayer body was rapidly changed depending on the sintering temperature.

That is, it may be appreciated that in the case in which m was 0, when the sintering temperature was decreased, the density after sintering the ceramic multilayer body was significantly small.

However, it may be appreciated that when m was 0.2, even in the case of comparing the case in which the sintering temperature was 1021° C. with the case in which the sintering temperature was 1106° C., a difference in density after sintering the ceramic multilayer body was not large.

Further, similarly to the case in which m was 0.2, when m was 0.3 or 0.4, even in the case of comparing the case in which the sintering temperature was 1021° C. with the case in which the sintering temperature was 1106° C., a difference in density after sintering the ceramic multilayer body was not large.

In the case of pure BaO, since a melting temperature thereof is excessively high (1923° C.), the pure BaO is not suitable for a sintering additive for low-temperature sintering.

However, in the case of containing a $Li_2O$—BaO compound as an accessory ingredient as in an exemplary embodiment of the present disclosure, it may be judged that a melting temperature is decreased, such that even though a sintering temperature is 1020° C. or less, low-temperature densification due to the liquid phase may be induced.

It may be appreciated that this judgment coincides with the results shown in FIG. 1.

Therefore, it may be appreciated that the $Li_2O$—BaO compound, which is the accessory ingredient according to an exemplary embodiment of the present disclosure, may induce densification of $BaTiO_3$ at a low temperature to decrease the sintering temperature.

Figure 3:
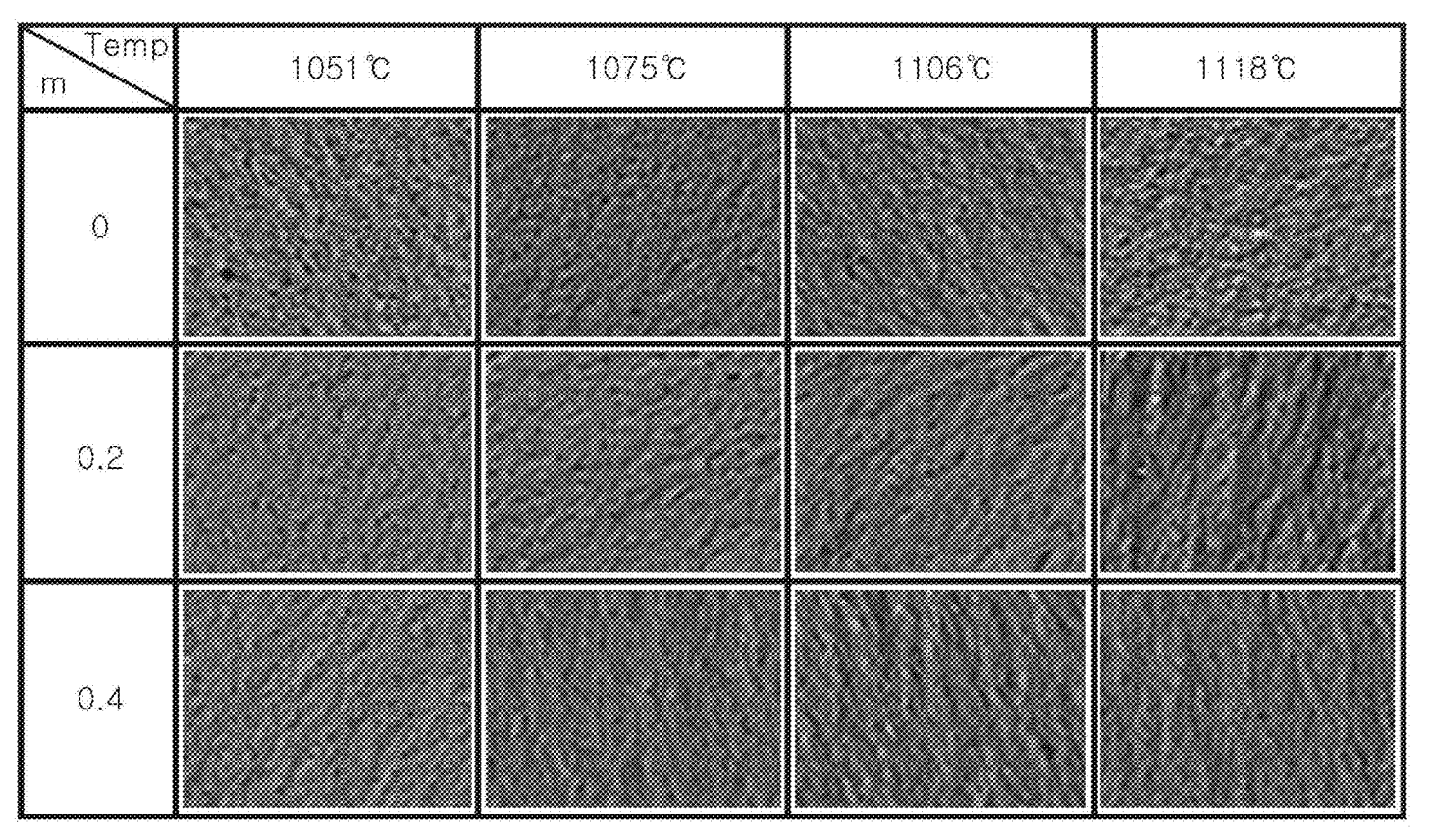

FIG. 3 is photographs showing micro-structures of sintered ceramic multilayer bodies after sintering, depending on a sintering temperature of the ceramic multilayer body.

Referring to FIG. 3, it may be appreciated that in the case in which m was 0, particles were significantly small, and a large amount of residual pores existed.

Particularly, in the case in which the sintering temperature was 1051° C., residual pores were significantly large, and even in the case in which the sintering temperature was 1118° C., some residual pores existed.

However, it may be appreciated that in the cases in which m was 0.2 and 0.4, a liquid phase was formed due to the accessory ingredient, such that the ceramic multilayer body had a dense micro-structure.

In addition, it may be appreciated that in the cases in which m was 0.2 and 0.4, the residual pores were significantly small.

That is, in view of the micro-structure, in the case of containing the $Li_2O$—BaO compound as the accessory ingredient in the dielectric composition for low-temperature sintering, densification may be induced by the liquid phase at a relatively low temperature as compared to the related art, and grain growth may be simultaneously induced.

Figure 4:
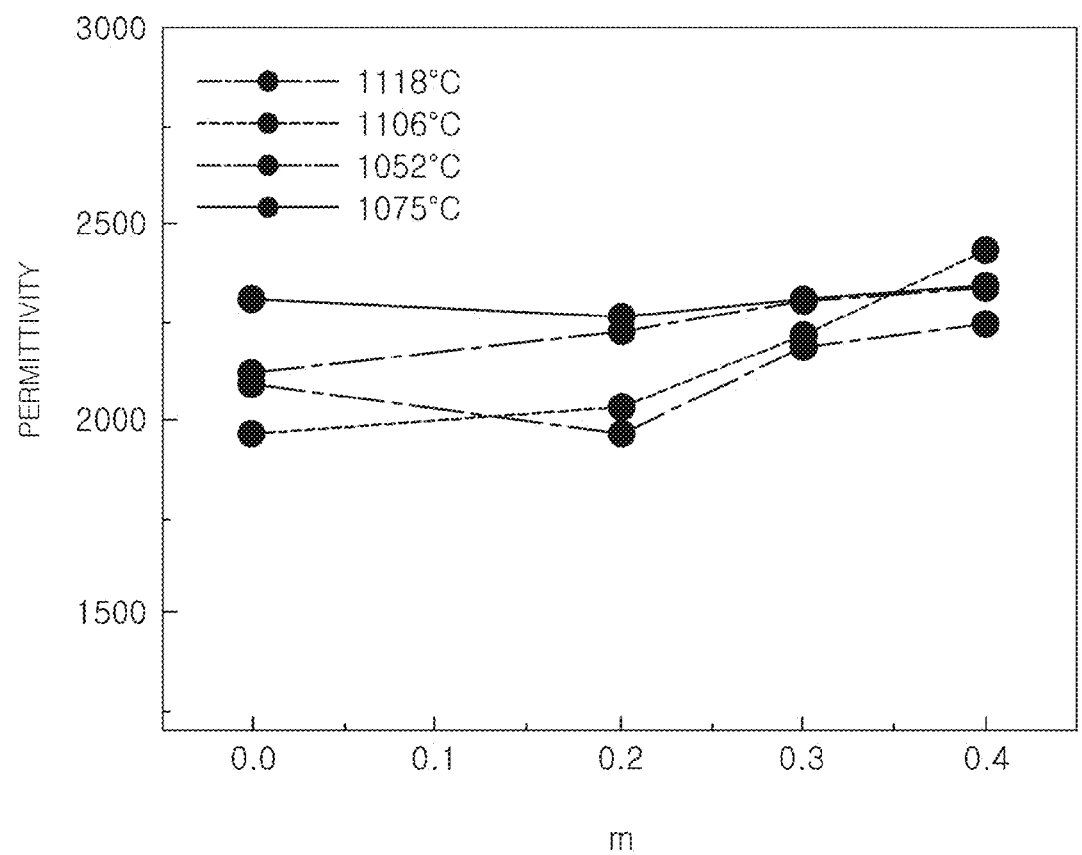
FIGS. 4 and 5 are graphs showing permittivity and a dissipation factor after sintering a ceramic multilayer body manufactured by adjusting a composition ratio of an accessory ingredient of a dielectric composition for low-temperature sintering according to the present disclosure and then using this dielectric composition at each sintering temperature.
Figure 5:
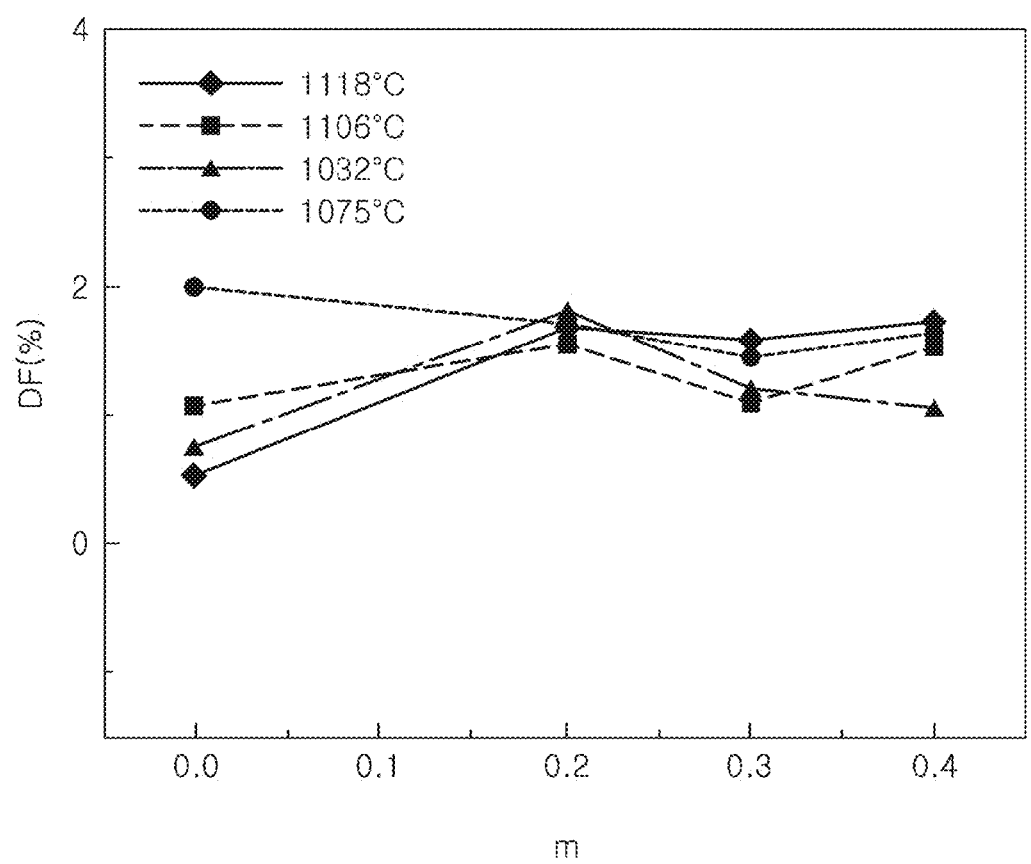

FIGS. 4 and 5 are graphs showing permittivity and a dissipation factor after sintering a ceramic multilayer body manufactured by adjusting a composition ratio of an accessory ingredient of a dielectric composition for low-temperature sintering according to the present disclosure and then using this dielectric composition at each sintering temperature.

Referring to FIG. 4, it may be appreciated that in the case in which m was 0, as the sintering temperature was decreased, permittivity was significantly decreased.

Particularly, referring to FIG. 5, it may be appreciated that in the case in which the sintering temperature was 1106° C. or less and m was 0, since a degree of densification of the ceramic multilayer body was low, the dissipation factor was significantly decreased as compared to a decrease in permittivity.

However, it may be appreciated that in the case in which m was 0.2, the ceramic multilayer body had significantly stable dissipation factor characteristics while maintaining permittivity similar to that in the case in which m was 0.

The reason may be that in the case of containing the $Li_2O$—$BaO$ compound as the accessory ingredient in the dielectric composition for low-temperature sintering, a density was increased by low-temperature densification due to liquid phase formation by the $Li_2O$—$BaO$ compound, such that dielectric properties at the time of low-temperature sintering were improved.

Therefore, in the case of containing the $Li_2O$—$BaO$ compound as the accessory ingredient as in the dielectric composition for low-temperature sintering according to an exemplary embodiment of the present disclosure, dielectric properties may be improved.

However, there is a need to adjust the content of the $Li_2O$—$BaO$ compound as the accessory ingredient as in the dielectric composition for low-temperature sintering.

Figure 6:
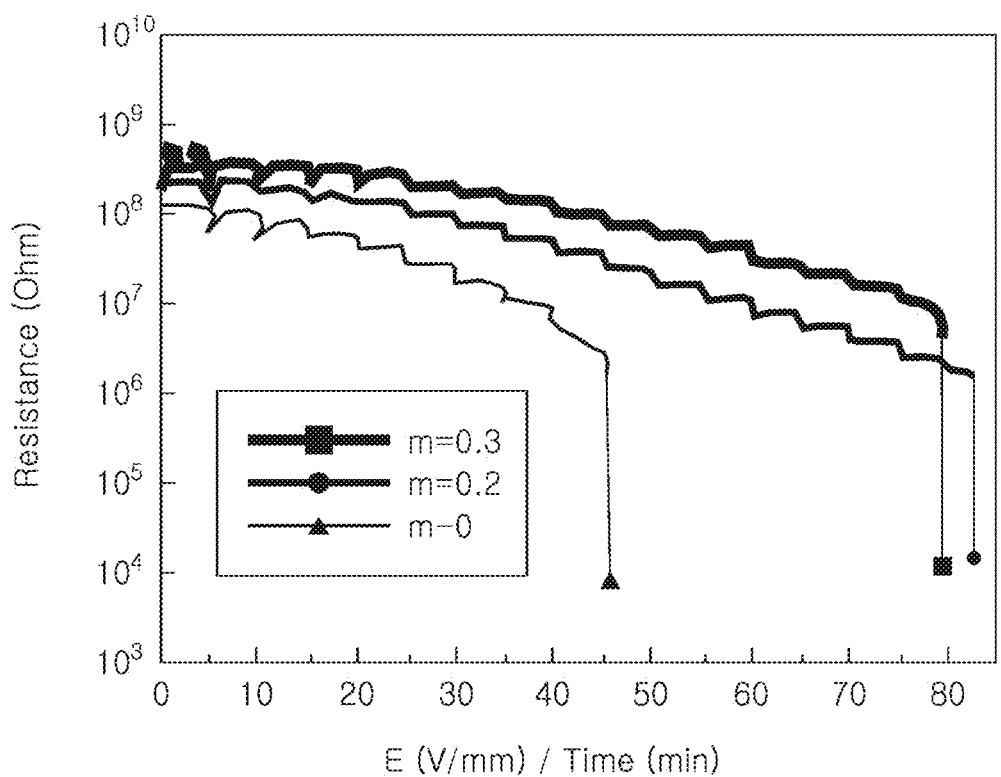
FIG. 6 is a graph showing high-temperature insulation resistance (IR) after sintering a ceramic multilayer body manufactured by adjusting a composition ratio of an accessory ingredient of a dielectric composition for low-temperature sintering according to the present disclosure and then using this dielectric composition at the sintering temperature.

FIG. 6 is a graph showing high-temperature insulation resistance (IR) after sintering a ceramic multilayer body manufactured by adjusting a composition ratio of an accessory ingredient of a dielectric composition for low-temperature sintering according to the present disclosure and then using this dielectric composition at the sintering temperature.

Referring to FIG. 6, in the case in which m was 0, a measured failure voltage of the ceramic multilayer body was low (45 V/mm).

The reason may be that a breakdown voltage was decreased by internal residual pores due to a decrease in the sintering density.

On the other hand, in the case of containing the $Li_2O$—$BaO$ compound as the accessory ingredient, a failure voltage may be increased to about 82 V/mm.

The reason may be that densification was improved by the $Li_2O$—$BaO$ compound as the accessory ingredient, such that the sintering density was improved.

The dielectric composition for low-temperature sintering according to an exemplary embodiment of the present disclosure may further contain 1.0 mol % of $BaCO_3$, 0.3 mol % of $SiO_2$, and 1.0 mol % of $Al_2O_3$ as first auxiliary ingredients, on the basis of 100 mol % of the main ingredient.

The first auxiliary ingredients, which are sintering additives, may serve to assist in adjusting properties such as a sintering temperature at the time of sintering, a degree of densification, IR, and the like.

In addition, the dielectric composition for low-temperature sintering according to an exemplary embodiment of the present disclosure may further contain 1.0 mol % of $Mn_3O_4$, 1.1 mol % of $V_2O_5$, and 5.2 mol % of $Dy_2O_3$ as second auxiliary ingredients, on the basis of 100 mol % of the main ingredient.

The secondary auxiliary ingredients do not have a large influence on permittivity and may suppress grain growth of the dielectric composition or control movement of oxygen vacancy to improve a sintering property, insulation resistance, an insulation breakdown voltage, an average life time, and the like.

Multilayer Ceramic Electronic Component and Method of Manufacturing the Same

Figure 7:
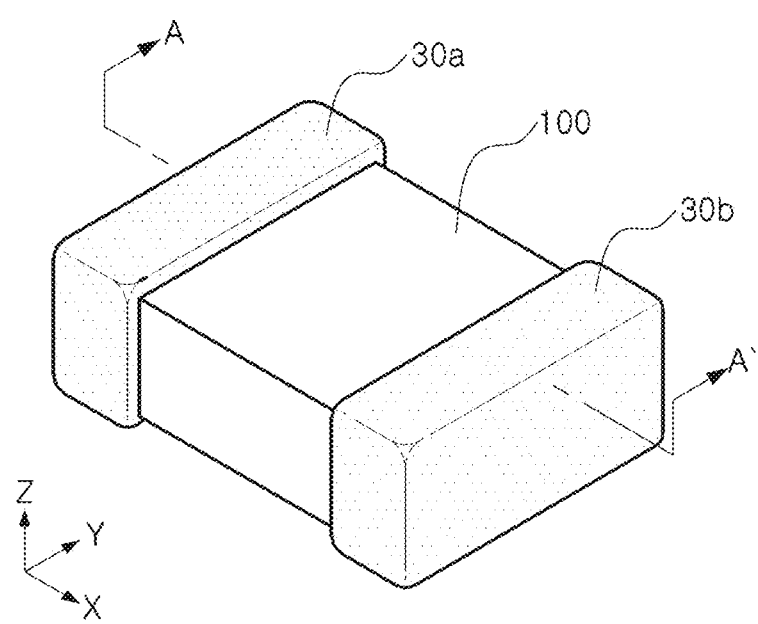
FIG. 7 is a perspective view of a multilayer ceramic electronic component according to another exemplary embodiment of the present disclosure.
Figure 8:
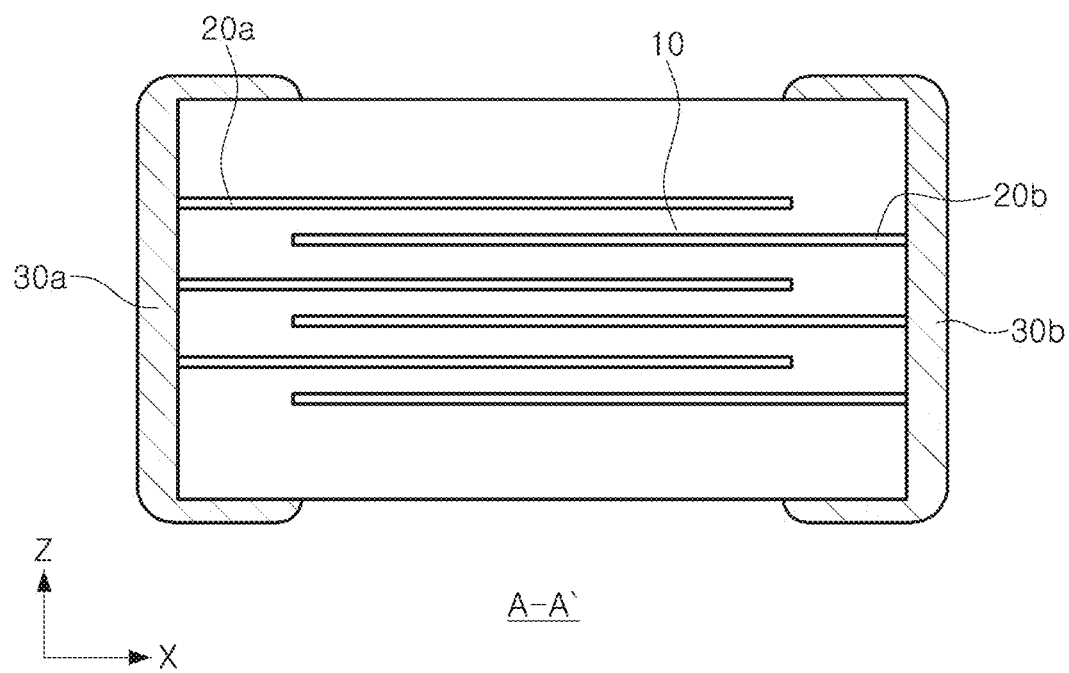
FIG. 8 is a cross-sectional view taken along line A-A' of FIG. 7.

FIG. 7 is a perspective view of a multilayer ceramic electronic component according to another exemplary embodiment of the present disclosure, and FIG. 8 is a cross-sectional view taken along line A-A' of FIG. 7.

Referring to FIGS. 7 and 8, the multilayer ceramic electronic component according to another exemplary embodiment of the present disclosure may include a multilayer body 100 formed by stacking a plurality of dielectric layers 10 containing $BaTiO_3$ as a main ingredient and a $Li_2O$—$BaO$ compound as an accessory ingredient; first and second internal electrodes 20a and 20b formed on the dielectric layers so as to have alternating polarities; a first external electrode 30a formed on one end surface of the multilayer body 100 to be electrically connected to the first internal electrodes 20a; and a second external electrode 30b formed on the other end surface of the multilayer body 100 opposing one surface thereof on which the first external electrode 30a is formed to be electrically connected to the second internal electrodes 20b.

The dielectric layer 10 may be formed using the above-mentioned dielectric composition for low-temperature sintering.

That is, the dielectric composition for low-temperature sintering according to an exemplary embodiment of the present disclosure is used, such that the sintering may be performed at a temperature lower than a temperature at which nickel internal electrodes are oxidized or aggregated.

According to the related art, the dielectric layer 10 having a predetermined thickness or less may not be manufactured due to a short-circuit caused by a phenomenon that the nickel internal electrodes is aggregated at a high temperature.

However, in the multilayer ceramic electronic component according to an exemplary embodiment of the present disclosure, since the dielectric layer is formed using the dielectric composition for low-temperature sintering and sintered at a low temperature, the aggregation phenomenon of the nickel internal electrodes may be significantly decreased.

Therefore, even in the case of forming the dielectric layer 10 to be thin, the reliability may not be deteriorated, and high capacitance (high performance) may be secured.

Therefore, in another exemplary embodiment of the present disclosure, a thickness of the dielectric layer 10 may be 1 μm to 2 μm.

In the case in which the thickness of the dielectric layer 10 is less than 1 μm, adjacent internal electrodes 20a and 20b come in contact with each other, such that the short-circuit may be generated, and in the case in which the thickness of the dielectric layer 10 is more than 2 μm, it may be difficult to secure super high capacitance.

A degree of densification of the dielectric layer 10 may be 97% or more.

According to the related art, in the case of sintering a ceramic green sheet at 1000° C. to 1150° C., a degree of densification is decreased below 97%.

However, in the dielectric layer 10 according to an exemplary embodiment of the present disclosure, the degree of densification of 97% or more may be secured by using the dielectric composition for low-temperature sintering.

The first internal electrode 20a may be formed on the dielectric layer 10 so as to be connected to the first external electrode 30a.

In addition, the second internal electrode 20b may be formed on the dielectric layer 10 so as to be connected to the second external electrode 30b.

The multilayer body 100 may be formed by alternately stacking the dielectric layer 10 on which the first internal electrode 20a is formed and the dielectric layer 10 on which he second internal electrode 20b is formed.

For example, the first and second internal electrodes 20a and 20b may have different polarities from each other by connecting a positive (+) voltage to the first external electrode 30a and connecting a negative (−) voltage to the second external electrode 30b.

Therefore, dipoles may be formed in the dielectric layer 10 between the first and second internal electrodes 20a and 20b, such that the multilayer ceramic electronic component according to an exemplary embodiment of the present disclosure may act as a capacitor.

The first and second external electrodes 30a and 30b may be formed on both end surfaces of the multilayer body in the length direction, respectively.

Figure 9:
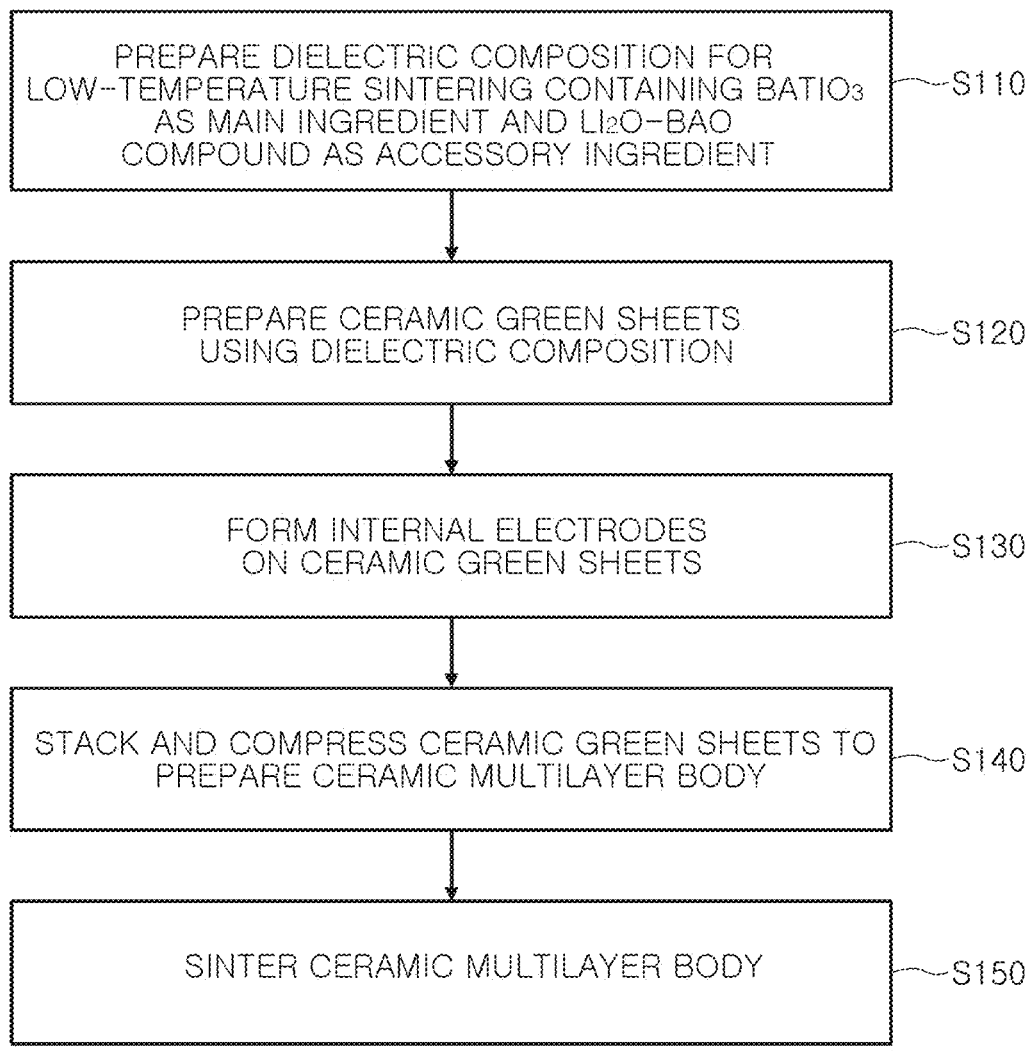
FIG. 9 is a schematic flow chart showing a method of manufacturing a multilayer ceramic electronic component according to another exemplary embodiment of the present disclosure.

FIG. 9 is a schematic flow chart showing a method of manufacturing a multilayer ceramic electronic component according to another exemplary embodiment of the present disclosure.

Referring to FIG. 9, the method of manufacturing a multilayer ceramic electronic component according to another exemplary embodiment of the present disclosure may include: preparing a dielectric composition for low-temperature sintering containing BaTiO$_3$ as a main ingredient and a Li$_2$O—BaO compound as an accessory ingredient (S110); preparing a ceramic green sheet using the dielectric composition (S120); forming internal electrodes on the ceramic green sheets (S130); stacking and compressing the ceramic green sheets to prepare a ceramic multilayer body (S140); and sintering the ceramic multilayer body (S150).

In the preparing of the dielectric composition (S110), in order to prepare the Li$_2$O—BaO compound used as the accessory ingredient, Li$_2$O may be prepared from Li$_2$CO$_3$, and BaO may be prepared from BaCO$_3$.

The above-mentioned Li$_2$O and BaO may be weighed at a suitable ratio, mixed with each other by a dry or wet (alcohol) method, and then dried.

Thereafter, in order to form the Li$_2$O—BaO compound, a temperature may be maintained at 500 to 750° C., which is a phase formation temperature, for 60 minutes.

In the preparing of the ceramic green sheet (S120), the ceramic green sheet may be manufactured by mixing the dielectric composition for low-temperature sintering, a binder, and a solvent with each other to prepare slurry, and forming the prepared slurry in a sheet shape having a thickness of several μm by a doctor blade method.

In addition, the internal electrode may be formed on the ceramic green sheet using a conductive paste (S130).

The internal electrode may be formed of a conductive paste composition containing conductive metal powder.

The conductive metal powder is not specially limited. For example, silver (Ag), lead (Pg), platinum (Pt), nickel (Ni), copper (Cu), or the like, may be used alone, or a mixture of at least two thereof may be used.

After the internal electrode is formed as described above, a ceramic multilayer body may be formed by separating the ceramic green sheet from a carrier film and then stacking a plurality of ceramic green sheets on each other, respectively, so as to be overlapped with each other (S140).

Thereafter, the formed ceramic multilayer body may be compressed, sintered, cut, and polished, thereby manufacturing a ceramic multilayer body (S150).

Particularly, in the multilayer ceramic electronic component according to the present disclosure, since the dielectric composition for low-temperature sintering is used, the sintering may be performed at 1000° C. to 1150° C.

Therefore, the aggregation phenomenon or oxidation of the internal electrode may be prevented, whereby the capacitance (performance) and reliability of the multilayer ceramic electronic component may be improved.

After the sintering of the ceramic multilayer body (S150), forming external electrodes electrically connected to the internal electrodes on the ceramic multilayer body may be further included.

The forming of the external electrode may be performed on the end surfaces of the ceramic multilayer body in the length direction, that is, surfaces to which the internal electrodes are exposed, using a conductive paste.

As set forth above, according to exemplary embodiments of the present disclosure, the dielectric composition for low-temperature sintering contains BaTiO$_3$ as a main ingredient and a Li$_2$O—BaO compound as an accessory ingredient to thereby decrease the sintering temperature, such that the dielectric composition may be sintered at a low temperature, have a dense micro-structure even at a low temperature, and have excellent dielectric properties.

In addition, in the method of manufacturing a multilayer ceramic electronic component according to the present disclosure, the sintering may be performed at 1000° C. to 1150° C. by using the dielectric composition for low-temperature sintering according to the present disclosure, whereby the aggregation phenomenon of the nickel internal electrodes may be prevented.

Further, the multilayer ceramic electronic component containing the dielectric composition for low-temperature sintering according to the present disclosure may have a high degree of densification, such that high capacitance may be obtained, and the aggregation phenomenon of the nickel internal electrodes may be prevented by decreasing the sintering temperature, thereby securing high reliability.

While exemplary embodiments have been shown and described above, it will be apparent to those skilled in the art that modifications and variations could be made without departing from the scope of the present invention as defined by the appended claims.

What is claimed is:

1. A dielectric composition for low-temperature sintering, the dielectric composition comprising:

BaTiO$_3$ as a main ingredient; and a Li$_2$O—BaO compound as an accessory ingredient, wherein the accessory ingredient is contained in an amount of 0.2 mol % to 0.8 mol %, on the basis of 100 mol % of the main ingredient, and wherein the Li$_2$O—BaO compound is (2-2x)Li$_2$O-xBaO, where x is 0.1 to 0.9.

2. The dielectric composition of claim 1, wherein the Li$_2$O—BaO compound is formed of at least one selected from the group consisting of Li$_{1.8}$Ba$_{0.1}$O, Li$_{1.6}$Ba$_{0.2}$O, Li$_{1.4}$Ba$_{0.3}$O, Li$_{1.2}$Ba$_{0.4}$O, Li$_{1.0}$Ba$_{0.5}$O, Li$_{0.8}$Ba$_{0.6}$O, Li$_{0.6}$Ba$_{0.7}$O, Li$_{0.4}$Ba$_{0.8}$O, Li$_{0.2}$Ba$_{0.9}$O, and mixtures thereof.

3. A dielectric composition for low-temperature sintering, the dielectric composition comprising:
  $BaTiO_3$ as a main ingredient; and
  a $Li_2O$—BaO compound as an accessory ingredient,
  wherein the accessory ingredient is contained in an amount of 0.2 mol % to 0.8 mol % On the basis of 100 mol % of the main ingredient, and
  wherein the $Li_2O$—BaO compound is $(1-y)Li_2O\text{-}yBaO$, where y is 0.1 to 0.8.

4. The dielectric composition of claim 3, wherein the $Li_2O$—BaO compound is formed of at least one selected from the group consisting of $Li_{0.9}Ba_{0.1}O_{0.55}$, $Li_{0.8}Ba_{0.2}O_{0.6}$, $Li_{0.7}Ba_{0.3}O_{0.65}$, $Li_{0.6}Ba_{0.4}O_{0.7}$, $Li_{0.5}Ba_{0.5}O_{0.75}$, $Li_{0.4}Ba_{0.6}O_{0.8}$, $Li_{0.3}Ba_{0.7}O_{0.85}$, $Li_{0.2}Ba_{0.8}O_{0.9}$, and mixtures thereof.

5. A dielectric composition for low-temperature sintering, the dielectric composition comprising:
  $BaTiO_3$ as a main ingredient; and
  a $Li_2O$—BaO compound as an accessory ingredient,
  wherein the accessory ingredient is contained in an amount of 0.2 mol % to 0.8 mol % on the basis of 100 mol % of the main ingredient, and
  wherein the $Li_2O$—BaO compound is $zLi_2O\text{-}(2-2z)BaO$, where z is 0.1 to 0.7.

6. The dielectric composition of claim 5, wherein the $Li_2O$—BaO compound is formed of at least one selected from the group consisting of $Li_{0.1}Ba_{1.8}O_5$, $Li_{0.2}Ba_{1.6}O_{1.7}$, $Li_{0.3}Ba_{1.4}O_{1.55}$, $Li_{0.4}Ba_{1.2}O_{1.4}$, $Li_{0.5}Ba_{1.0}O_{1.25}$, $Li_{0.6}Ba_{0.8}O_{1.1}$, $Li_{0.7}Ba_{0.6}O_{0.95}$, and mixtures thereof.

7. The dielectric composition of claim 1, further comprising:
  1.0 mol % of $BaCO_3$;
  0.3 mol % of $SiO_2$; and
  1.0 mol % of $Al_2O_3$, as first auxiliary ingredients, on the basis of 100 mol % of the main ingredient.

8. The dielectric composition of claim 1, further comprising:
  1.0 mol % of $Mn_3O_4$;
  1.1 mol % of $V_2O_5$; and
  5.2 mol % of $Dy_2O_3$, as second auxiliary ingredients, on the basis of 100 mol % of the main ingredient.

9. A multilayer ceramic electronic component comprising:
  a multilayer body formed by stacking a plurality of dielectric layers containing $BaTiO_3$ as a main ingredient and a $Li_2O$—BaO compound as an accessory ingredient;
  first and second internal electrodes provided on the dielectric layers so as to have alternating polarities;
  a first external electrode provided on one end surface of the multilayer body to be electrically connected to the first internal electrodes; and
  a second external electrode provided on the other end surface of the multilayer body opposing one surface thereof on which the first external electrode is provided to be electrically connected to the second internal electrodes,
  wherein the accessory ingredient is contained in an amount of 0.2 mol % to 0.8 mol %, on the basis of 100 mol % of the main ingredient, and
  wherein the $Li_2$—BaO compound is $(2-2x)Li_2O\text{-}xBaO$, where x is 0.1 to 0.9.

10. A method of manufacturing a multilayer ceramic electronic component, the method comprising:
  preparing a dielectric composition for low-temperature sintering containing $BaTiO_3$ as a main ingredient and a $Li_2O$—BaO compound as an accessory ingredient;
  preparing ceramic green sheets using the dielectric composition;
  forming internal electrodes on the ceramic green sheets;
  stacking and compressing the ceramic green sheets to prepare a ceramic multilayer body; and
  sintering the ceramic multilayer body,
  wherein the accessory ingredient is contained in an amount of 0.2 mol % to 0.8 mol %, on the basis of 100 mol % of the main ingredient, and
  wherein the $Li_2$—BaO compound is $(2-2x)Li_2O\text{-}xBaO$, where x is 0.1 to 0.9.

11. The method of claim 10, wherein the sintering of the ceramic multilayer body is performed at 1000° C. to 1150° C.

12. The method of claim 10, wherein the $Li_2O$—BaO compound is formed of at least one selected from the group consisting of $Li_{1.8}Ba_{0.1}O$, $Li_{1.6}Ba_{0.2}O$, $Li_{1.4}Ba_{0.3}O$, $Li_{1.2}Ba_{0.4}O$, $Li_{1.0}Ba_{0.5}O$, $Li_{0.8}Ba_{0.6}O$, $Li_{0.6}Ba_{0.7}O$, $Li_{0.4}Ba_{0.8}O$, $Li_{0.2}Ba_{0.9}O$, and mixtures thereof.

13. A method of manufacturing a multilayer ceramic electronic component, the method comprising:
  preparing a dielectric composition for low-temperature sintering containing $BaTiO_3$ as a main ingredient and a $Li_2O$—BaO compound as an accessory ingredient;
  preparing ceramic green sheets using the dielectric composition;
  forming internal electrodes on the ceramic green sheets;
  stacking and compressing the ceramic green sheets to prepare a ceramic multilayer body; and
  sintering the ceramic multilayer body,
  wherein the accessory ingredient is contained in an amount of 0.2 mol % to 0.8 mol& on the basis of 100 mol % of the main ingredient, and
  wherein the $Li_2O$—BaO compound is $(1-y)Li_2O\text{-}yBaO$, where y is 0.1 to 0.8.

14. The method of claim 13, wherein the $Li_2O$—BaO compound is formed of at least one selected from the group consisting of $Li_{0.9}Ba_{0.1}O_{0.55}$, $Li_{0.8}Ba_{0.2}O_{0.6}$, $Li_{0.7}Ba_{0.3}O_{0.65}$, $Li_{0.6}Ba_{0.4}O_{0.7}$, $Li_{0.5}Ba_{0.5}O_{0.75}$, $Li_{0.4}Ba_{0.6}O_{0.8}$, $Li_{0.3}Ba_{0.7}O_{0.85}$, $Li_{0.2}Ba_{0.8}O_{0.9}$, and mixtures thereof.

15. A method of manufacturing a multilayer ceramic electronic component, the method comprising:
  preparing a dielectric composition for low-temperature sintering containing $BaTiO_3$ as a main ingredient and a $Li_2O$—BaO compound as an accessory ingredient;
  preparing ceramic green sheets using the dielectric composition;
  forming internal electrodes on the ceramic green sheets;
  stacking and compressing the ceramic green sheets to prepare a ceramic multilayer body; and
  sintering the ceramic multilayer body,
  wherein the accessory ingredient is contained in an amount of 0.2 mol % to 0.8 mol& on the basis of 100 mol % of the main ingredient, and
  wherein the $Li_2O$—BaO compound is $zLi_2O\text{-}(2-2z)BaO$, where z is 0.1 to 0.7.

16. The method of claim 15, wherein the $Li_2O$—BaO compound is formed of at least one selected from the group consisting of $Li_{0.1}Ba_{1.8}O_5$, $Li_{0.2}Ba_{1.6}O_{1.7}$, $Li_{0.3}Ba_{1.4}O_{1.55}$, $Li_{0.4}Ba_{1.2}O_{1.4}$, $Li_{0.5}Ba_{1.0}O_{1.25}$, $Li_{0.6}Ba_{0.8}O_{1.1}$, $Li_{0.7}Ba_{0.6}O_{0.95}$, and mixtures thereof.

17. The method of claim 10, wherein the dielectric composition further contains:
  1.0 mol % of $BaCO_3$;
  0.3 mol % of $SiO_2$; and 1.0 mol % of $Al_2O_3$, as first auxiliary ingredients, on the basis of 100 mol % of the main ingredient.

18. The method of claim 10, wherein the dielectric composition further contains:
   1.0 mol % of $Mn_3O_4$;
   1.1 mol % of $V_2O_5$; and New
   5.2 mol % of $Dy_2O_3$, as second auxiliary ingredients, on the basis of 100 mol % of the main ingredient.

19. The multilayer ceramic electronic component of claim 9, wherein the $Li_2O$—$BaO$ compound is formed of at least one selected from the group consisting of $Li_{1.8}Ba_{0.1}O$, $Li_{1.6}Ba_{0.2}O$, $Li_{1.4}Ba_{0.3}O$, $Li_{1.2}Ba_{0.4}O$, $Li_{1.0}Ba_{0.5}O$, $Li_{0.8}Ba_{0.6}O$, $Li_{0.6}Ba_{0.7}O$, $Li_{0.4}Ba_{0.8}O$, $Li_{0.2}Ba_{0.9}O$, and mixtures thereof.

20. A multilayer ceramic electronic component comprising:
   a multilayer body formed by stacking a plurality of dielectric layers containing $BaTiO_3$ as a main ingredient and a $Li_2O$—$BaO$ compound as an accessory ingredient;
   first and second internal electrodes provided on the dielectric layers so as to have alternating polarities;
   a first external electrode provided on one end surface of the multilayer body to be electrically connected to the first internal electrodes; and
   a second external electrode provided on the other end surface of the multilayer body opposing one surface thereon on which the first external electrode is provided to be electrically connected to the second internal electrodes,
   wherein the accessory ingredient is contained in an amount of 0.2 mol % to 0.8 mol %, on the basis of 100 mol % on the main ingredient, and
   wherein the $Li_2O$—$BaO$ compound is $(1-y)Li_2O$-$yBaO$, where y is 0.1 to 0.8.

21. The multilayer ceramic electronic component of claim 20, wherein the $Li_2O$—$BaO$ compound is formed of at least one selected from the group consisting of $Li_{0.9}Ba_{0.1}O_{0.55}$, $Li_{0.8}Ba_{0.2}O_{0.6}$, $Li_{0.7}Ba_{0.3}O_{0.65}$, $Li_{0.6}Ba_{0.4}O_{0.7}$, $Li_{0.5}Ba_{0.5}O_{0.75}$, $Li_{0.4}Ba_{0.6}O_{0.8}$, $Li_{0.3}Ba_{0.7}O$, $Li_{0.4}Ba_{0.8}O_{0.85}$, $Li_{0.2}Ba_{0.8}O_{0.9}$, and mixtures thereof.

22. A multilayer ceramic electronic component comprising:
   a multilayer body formed by stacking a plurality of dielectric layers containing $BaTiO_3$ as a main ingredient and a $Li_2O$—$BaO$ compound as an accessory ingredient;
   first and second internal electrodes provided on the dielectric layers so as to have alternating polarities;
   a first external electrode provided on one end surface of the multilayer body to be electrically connected to the first internal electrodes; and
   a second external electrode provided on the other end surface of the multilayer body opposing one surface thereof on which the first external electrode is provided to be electrically connected to the second internal electrodes,
   wherein the accessory ingredient is contained in an amount of 0.2 mol % to 0.8 mol %, on the basis of 100 mol % on the main ingredient, and
   wherein the $Li_2O$—$BaO$ compound is $zLi_2O$-$(2-2z)BaO$, where z is 0.1 to 0.7.

23. The multilayer ceramic electronic component of claim 22, wherein the $Li_2O$—$BaO$ compound is formed of at least one selected from the group consisting of $Li_{0.9}Ba_{0.1}O_{0.55}$, $Li_{0.1}Ba_{1.8}O_5$, $Li_{0.2}Ba_{1.6}O_{1.7}$, $Li_{0.3}Ba_{1.4}O_{1.55}$, $Li_{0.4}Ba_{1.2}O_{1.4}$, $Li_{0.5}Ba_{1.0}O_{1.25}$, $Li_{0.6}Ba_{0.8}O_{1.1}$, $Li_{0.7}Ba_{0.6}O_{0.95}$ and mixtures thereof.

* * * * *